(12) United States Patent
Ang et al.

(10) Patent No.: US 8,151,224 B1
(45) Date of Patent: Apr. 3, 2012

(54) METHOD OF DESIGNING INTEGRATED CIRCUITS INCLUDING PROVIDING AN OPTION TO SELECT A MASK LAYER SET

(75) Inventors: Boon Jin Ang, Bagan Ajam Butterworth (MY); Kar Keng Chua, Juru (MY); Choong Kit Wong, Sungai Ara (MY); Kok Yoong Foo, Simpang Ampat (MY); Thow Pang Chong, Sungai Ara (MY)

(73) Assignee: Altera Corporation, San Jose, CA (US)

( * ) Notice: Subject to any disclaimer, the term of this patent is extended or adjusted under 35 U.S.C. 154(b) by 618 days.

(21) Appl. No.: 12/345,187

(22) Filed: Dec. 29, 2008

(51) Int. Cl.
*G06F 17/50* (2006.01)

(52) U.S. Cl. ........................................................ 716/55

(58) Field of Classification Search ...................... 716/55
See application file for complete search history.

(56) References Cited

U.S. PATENT DOCUMENTS

| | | | | |
|---|---|---|---|---|
| 6,426,261 B1 * | 7/2002 | Fujii et al. | ...................... | 438/276 |
| 6,674,127 B2 * | 1/2004 | Kotani | ........................... | 257/347 |
| 6,769,110 B2 * | 7/2004 | Katoh et al. | .................. | 716/108 |
| 7,228,523 B2 * | 6/2007 | Kobayashi | ...................... | 716/52 |
| 7,802,217 B1 * | 9/2010 | Gopinath et al. | ............. | 716/109 |
| 2006/0017469 A1 * | 1/2006 | Lai | ................................. | 326/121 |

OTHER PUBLICATIONS

Chen, "Triple-threshold static power minimization technique in high-level synthesis using 90nm MTCMOS technology", Simon Fraser University, Summer, 2007.*

* cited by examiner

*Primary Examiner* — Jack Chiang
*Assistant Examiner* — Brandon Bowers
(74) *Attorney, Agent, or Firm* — Mauriel Kapouytian & Treffert LLP; Avarat Kapouytian

(57) ABSTRACT

A method of designing at IC is described. In one embodiment, the method includes providing an option to select a mask layer set from a plurality of mask layer sets, the plurality of mask layer sets including a first mask layer set and a second mask layer set, where the second mask layer set is an alternative mask layer option to the first mask layer set. In one embodiment, the method further includes receiving a selection from a user choosing a mask layer set from the plurality of mask layer sets. In one embodiment, the receiving occurs after design of the IC and prior to fabrication of the IC. Also, in one embodiment, the plurality of mask layer sets are predetermined mask layer sets. In one embodiment, the first mask layer set is a standard threshold voltage (SVT) mask layer set and the second mask layer set is a high threshold voltage (HVT) mask layer set. In one embodiment, core devices of the SVT mask layer set are SVT devices and some periphery devices of the SVT mask layer set are HVT devices. In one embodiment, hybrid cell (H-cell) devices of the HVT mask layer set are HVT devices and some periphery devices of the HVT mask layer set are HVT devices.

16 Claims, 2 Drawing Sheets

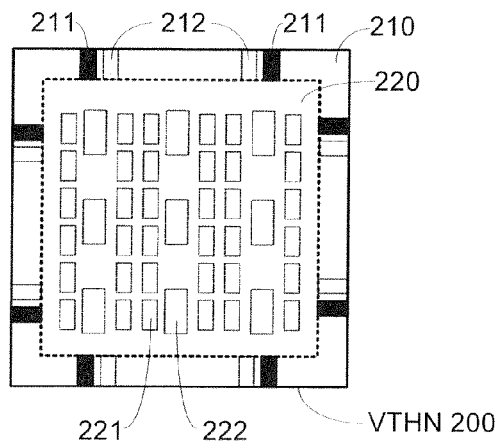
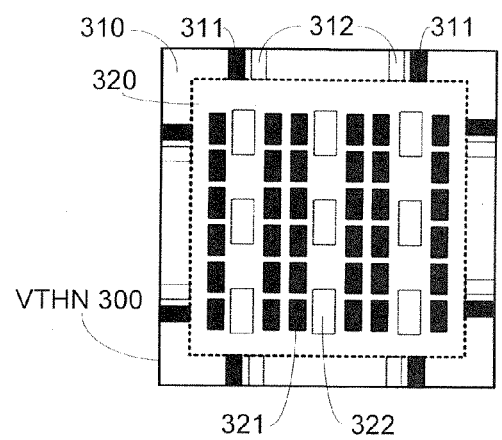
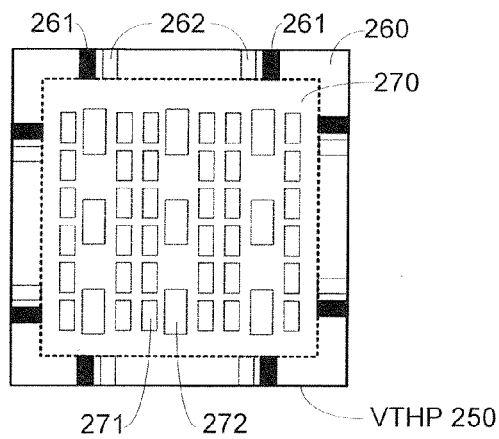
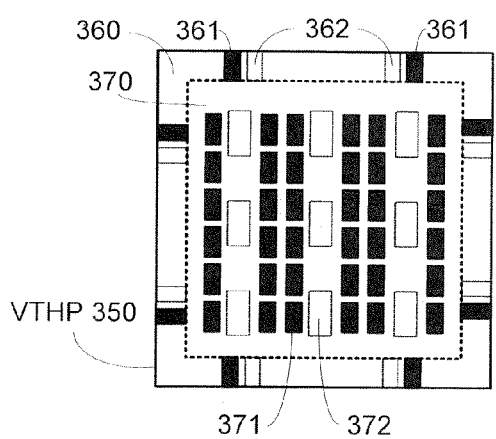
SVT Mask Layers
Option 130-1
HVT Mask Layers
Option 130-2
FIG. 2
FIG. 3

METHOD OF DESIGNING INTEGRATED CIRCUITS INCLUDING PROVIDING AN OPTION TO SELECT A MASK LAYER SET

BACKGROUND

The invention relates to the field of designing integrated circuits (ICs).

It is generally desirable to reduce the power consumed by an IC without sacrificing its performance. There are many techniques for achieving power savings in an IC. Examples of such techniques include back-biasing, clock gating, using multi-threshold voltage devices, powering down unused circuitry, and reducing the toggle rate. Using multi-threshold voltage devices involves using higher performance devices on critical paths and power efficient devices on non-critical paths. Some of these techniques, such as for example using multi-threshold voltage devices, affect the design of the IC. Such techniques that affect the design of the IC also affect the design of the mask layers used for fabricating the IC. The mask layers are designed and created in response to the design specifications, including those dictated by the power savings techniques. As a result, such power saving techniques are subject to non-recurring engineering (NRE) costs, which may be significant in the case of designing mask layers. Also, in some of these design techniques, the choices made regarding power savings are "fixed" once the IC design is completed. To be "unfixed," the IC must be redesigned which may involve significant costs depending on when the redesign is made. For example, the costs would be significant if the redesign is made after the mask layers for the "fixed" IC design are prepared.

SUMMARY

One embodiment of the present invention provides a method of designing an IC including providing an option to select a mask layer set from a plurality of mask layer sets, the plurality of mask layer sets including a first mask layer set and a second mask layer set, where the second mask layer set is an alternative mask layer option to the first mask layer set. In one embodiment, the method further includes receiving a selection from a user choosing a mask layer set from the plurality of mask layer sets. In one embodiment, the receiving occurs after design of the IC and prior to fabrication of the IC. Also, in one embodiment, the plurality of mask layer sets are predetermined mask layer sets.

In one embodiment, the first mask layer set is a standard threshold voltage (SVT) mask layer set and the second mask layer set is a high threshold voltage (HVT) mask layer set. In one embodiment, core devices of the SVT mask layer set are SVT devices and some periphery devices of the SVT mask layer set are HVT devices. In one embodiment, hybrid cell (H-cell) devices of the HVT mask layer set are HVT devices and some periphery devices of the HVT mask layer set are HVT devices.

With the above option provided by an embodiment of the present invention, if a customer's design does not need to run at a high maximum frequency (Fmax), the customer can benefit from additional direct current (DC) power savings by using the HVT mask layers option instead of the SVT mask layer option. It is to be noted that, in one embodiment, this can be achieved without additional NRE cost.

BRIEF DESCRIPTION OF THE DRAWINGS

The novel features of the invention are set forth in the appended claims. However, for purpose of explanation, several aspects of particular embodiments of the invention are described by reference to the following figures.

FIG. 2 is a schematic diagram of one embodiment of the SVT mask layers option.

FIG. 3 is a schematic diagram of one embodiment of the HVT mask layers option.

DETAILED DESCRIPTION

Figure 1:
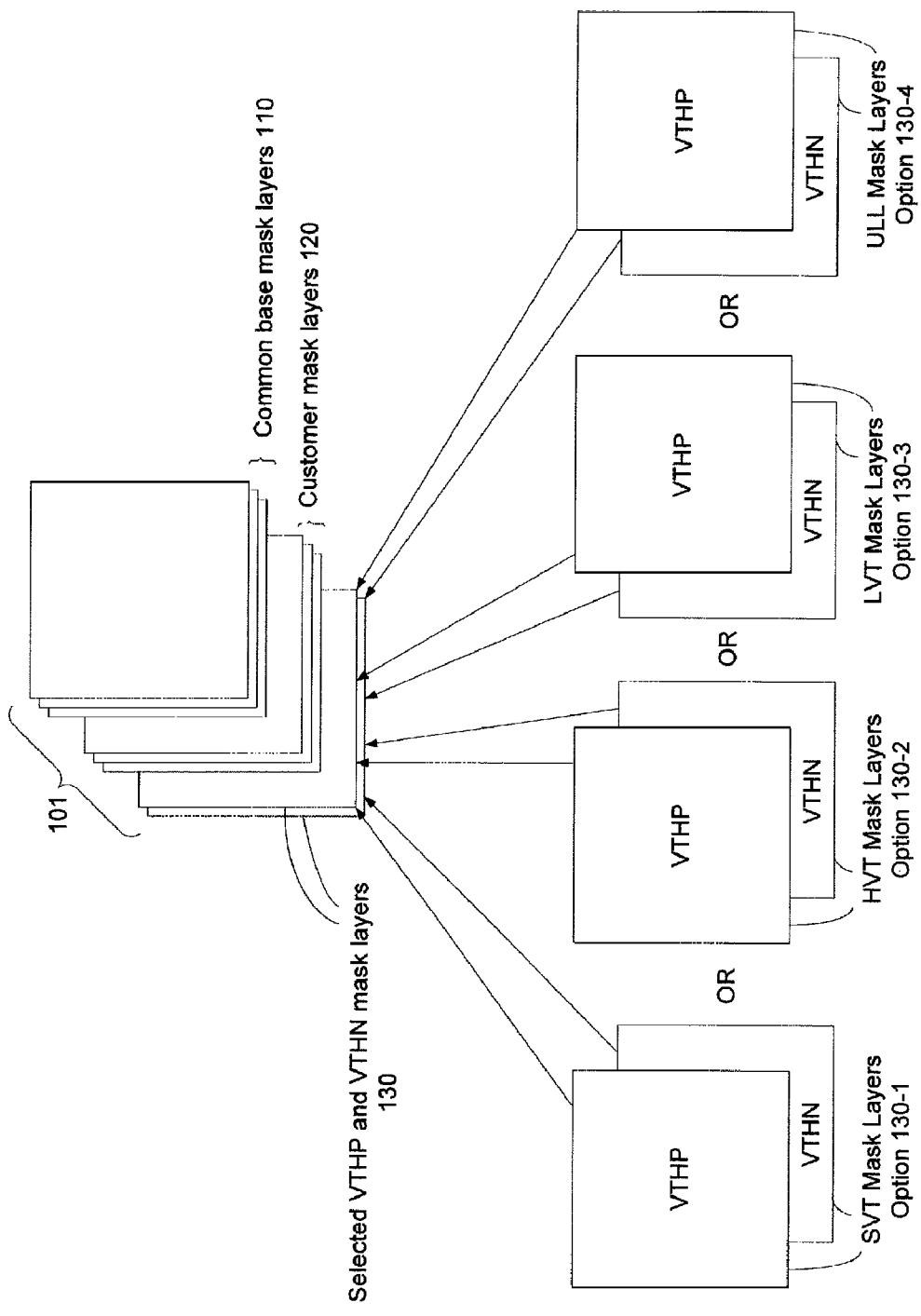
FIG. 1 is a schematic diagram of one embodiment of some mask layers used in the fabrication of a structured application specific IC (ASIC) and the mask layers options provided to the customers.

The following description is presented to enable any person skilled in the art to make and use the invention, and is provided in the context of particular applications and their requirements. Various modifications to the exemplary embodiments will be readily apparent to those skilled in the art, and the generic principles defined herein may be applied to other embodiments and applications without departing from the spirit and scope of the invention. Thus, the present invention is not intended to be limited to the embodiments shown, but is to be accorded the widest scope consistent with the principles and features disclosed herein.

FIG. 1 is a schematic diagram of one embodiment of mask layers used in the fabrication of a structured ASIC and the mask layers options provided to the customers. In FIG. 1, mask layers 101, the mask layers used in the fabrication of the structured ASIC, include common base mask layers 110, customer mask layers 120, and selected voltage threshold p-channel (VTHP) and voltage threshold n-channel (VTHN) mask layers 130. Common base mask layers 110 are the base mask layers that are in common for all customers of a particular type of structured ASIC. On the other hand, customer layers 120 are customer specific for each customer of a particular type of structured ASIC. In one embodiment, customer layers 120 affect the connectivity of the structured ASIC. In one embodiment, the customer layers 120 are created based on design specifications of the customer, who may also herein be referred to as the user. The VTHP and VTHN mask layers 130 are selected from a group of VTHP and VTHN mask layers. In one embodiment, the customer is provided the option of selecting one set of VTHP and VTHN mask layers from a plurality of sets of VTHP and VTHN make layers.

In one embodiment, the customer is provided the option of selecting from SVT mask layers option 130-1, HVT mask layers option 130-2, LVT mask layers option 130-3, and ULL mask layers option 130-4. These four mask layers options are alternatives to one another. In other words, the customer must select one of the four options and only the selected option maps to physical layers in the structured ASIC. As shown in FIG. 1, each of SVT, HVT, LVT, and ULL mask layers options 130-1 to 130-4 includes a VTHP mask layer and a VTHN mask layer. In one embodiment, the customer selects one of these mask layers options to be used in the fabrication of the structured ASIC. Selected VTHP and VTHN mask layers 130 are the mask layers option selected by the customer from mask layers options 130-1 to 130-4.

Each mask layers option may also herein be referred to as a mask layer set. For example, SVT mask layers option 130-1 may be referred to as SVT mask layer set 130-1. In FIG. 1, each mask layer set includes two mask layers. It is to be noted that, in one embodiment, a mask layer set may include less or more than two mask layers.

In one embodiment, mask layers options 130-1 to 130-4 are predetermined and independent of the customer design. In other words, the customer's design specifications do not change the design and fabrication of the mask layers that are part of the mask layers options 130-1 to 130-4. As such, in one embodiment, the mask layers options are part of the common base layers. Mask layers options 130-1 to 130-4 do not involve additional non-recurring engineering (NRE) costs for the customers. Furthermore, the cost of designing the additional mask layers options is amortized in the common base layers.

In one embodiment, the front-end design software (e.g., Quartus II® available from Altera Corporation of San Jose, Calif.) and the back-end design software support timing and power models for each of the mask layers options. In one embodiment, the front-end design software is used by the customer in designing features of the structured ASIC under the customer's design control, whereas the back-end design software is used by the structured ASIC vendor to design features of the structured ASIC under the vendor's control and to incorporate the customer's design specification in the overall design specification for the structured ASIC.

In one embodiment, during the front-end design stage, the front-end design software provides the customer the option of testing performance of the structured ASIC with the different mask options. In one embodiment, the customer selects the mask layers option after the design stage (i.e., both the front-end and back-end design stages), but prior to the fabrication stage. In another embodiment, the customer selects the mask layers option after the front-end design stage, but prior to the back-end design flow stage and the fabrication stage. Also, in one embodiment, the mask layers of the mask layers options are prepared prior to the selection by the customer. As a result, there is no increase in the turn-around time between receiving the customer's selection and fabricating the structured ASIC.

Each mask layer in mask layers 101 maps to a corresponding physical layer in the structured ASIC fabricated using mask layers 101. Furthermore, SVT mask layers option 130-1, HVT mask layers option 130-2, LVT mask layers option 130-3, and ULL mask layers option 130-4 all map to the same two physical layers in the structured ASIC. More specifically, the VTHP layers of these four options all map to one physical layer in the structured ASIC, whereas the VTHN layers of these four options all map to another one physical layer in the structured ASIC. It is to be noted that as the four options are alternative options, only the selected one of the four options maps to the corresponding two physical layers in the structured layers, whereas the unselected options are not used.

It is to be noted that the number of mask layers options and the type of mask layers options provided to the customer and shown in FIG. 1 is only exemplary. In other embodiments, the number of mask layers options and the type of mask layers options provided to the customer may be different from those shown in FIG. 1. For example, in another embodiment, only SVT mask layers options 130-1 and HVT mask layers options 130-2 may be provided to the customer. In yet another embodiment, the customer may be provided the option of choosing from mask layers options in addition to those shown in FIG. 1.

FIG. 2 is a schematic diagram of one embodiment of the SVT mask layers option. In FIG. 2, SVT mask layers option 130-1 includes VTHN mask layer 200 and VTHP mask layer 250.

VTHN mask layer 200 includes peripheral device area 210 and core device area 220. Peripheral device area 210 includes HVT device block areas 211 and SVT device block areas 212. It is to be noted that in peripheral device area 210, all darkly shaded rectangles correspond to HVT device block areas. In order to avoid obstructing the drawing, not all of these HVT device block areas have been designated with the reference number 211. However, as used herein HVT device block areas 211 refers to all HVT device block areas in peripheral device area 210. Similarly, it is to be noted that in peripheral device area 210, all unshaded (i.e., unfilled) rectangles correspond to SVT device block areas. In order to avoid obstructing the drawing, not all of these SVT device block areas have been designated with the reference number 212. However, as used herein SVT device block areas 212 refers to all SVT device block areas in peripheral device area 210.

Core device area 220 includes SVT device block areas 221 and SVT device block areas 222. It is to be noted that in core device area 220, all device blocks are SVT device blocks. In order to avoid obstructing the drawing, only one SVT device block area has been designated with the reference number 221 and only one SVT device block area has been designated with the reference number 222. It is to be noted that in core device area 220 all smaller rectangles represent SVT device block areas 221 and all larger rectangles represent SVT device block areas 222. In one embodiment, SVT device block areas 221 represent hybrid cell (H-cell) blocks, whereas SVT device block areas 222 represent memory blocks.

VTHP mask layer 250 includes peripheral device area 260 and core device area 270. Peripheral device area 260 includes HVT device block areas 261 and SVT device block areas 262. It is to be noted that in peripheral device area 260, all darkly shaded rectangles correspond to HVT device block areas. In order to avoid obstructing the drawing, not all of these HVT device block areas have been designated with the reference number 261. However, as used herein HVT device block areas 261 refers to all HVT device block areas in peripheral device area 260. Similarly, it is to be noted that in peripheral device area 260, all unshaded rectangles correspond to SVT device block areas. In order to avoid obstructing the drawing, not all of these SVT device block areas have been designated with the reference number 262. However, as used herein SVT device block areas 262 refers to all SVT device block areas in peripheral device area 260.

Core device area 270 includes SVT device block areas 271 and SVT device block areas 272. It is to be noted that in core device area 270, all devices are SVT devices. In order to avoid obstructing the drawing, only one SVT device block area has been designated with the reference number 271 and only one SVT device block area has been designated with the reference number 272. It is to be noted that in core device area 270 all smaller rectangles represent SVT device block areas 271 and all larger rectangles represent SVT device block areas 272. In one embodiment, SVT device block areas 271 represent H-cell blocks, whereas SVT device block areas 272 represent memory blocks.

It is to be noted that in FIG. 2, SVT device block areas 212, 221, 222, 262, 271, and 272 do not represent real patterns on the mask layers. Instead, they represent the location of blocks on the IC whose devices are SVT devices. In one embodiment, unless otherwise selected, devices in the structured ASIC would be SVT devices. In other words, in one embodiment, the default state for devices in the structured ASIC is SVT. As such, there is no real pattern on VHTN mask layer 200 and VHTP mask layer 250 for blocks with SVT devices. By contrast, in FIG. 2, HVT device block areas 211 and 261 represent real patterns on VHTN mask layer 200 and VHTP mask layer 250, respectively.

In one embodiment, HVT device block areas 211 and 261 represent blocks in the periphery of IC whose devices are thin oxide devices. Also, in one embodiment, SVT device block areas 212 and 262 represent blocks in the periphery of the IC whose devices are thick oxide devices. In one embodiment, one or more of HVT device block areas 211 and 261 may represent input/output (I/O) register blocks or serializer/deserializer (SerDes) blocks.

FIG. 3 is a schematic diagram of one embodiment of the HVT mask layers option. In FIG. 3, HVT mask layers option 130-2 includes VTHN mask layer 300 and VTHP mask layer 350.

VTHN mask layer 300 includes peripheral device area 310 and core device area 320. Peripheral device area 310 includes HVT device block areas 311 and SVT device block areas 312. It is to be noted that in peripheral device area 310, all darkly shaded rectangles correspond to HVT device block areas. In order to avoid obstructing the drawing, not all of these HVT device block areas have been designated with the reference number 311. However, as used herein HVT device block areas 311 refers to all HVT device block areas in peripheral device area 310. Similarly, it is to be noted that in peripheral device area 310, all unshaded rectangles correspond to SVT device block areas. In order to avoid obstructing the drawing, not all of these SVT device block areas have been designated with the reference number 312. However, as used herein SVT device block areas 312 refers to all SVT device block areas in peripheral device area 310.

Core device area 320 includes HVT device block areas 321 and SVT device block areas 322. It is to be noted that in core device area 320, all darkly shaded rectangles correspond to HVT device block areas. In order to avoid obstructing the drawing, not all of these HVT device block areas have been designated with the reference number 321. However, as used herein HVT device block areas 321 refers to all HVT device block areas in core device area 320. Similarly, it is to be noted that in core device area 320, all unshaded rectangles correspond to SVT device block areas. In order to avoid obstructing the drawing, not all of these SVT device block areas have been designated with the reference number 322. However, as used herein SVT device block areas 322 refers to all SVT device block areas in core device area 320. In one embodiment, HVT device block areas 321 represent H-cell blocks, whereas SVT device block areas 322 represent memory blocks.

VTHP mask layer 350 includes peripheral device area 360 and core device area 370. Peripheral device area 360 includes HVT device block areas 361 and SVT device block areas 362. It is to be noted that in peripheral device area 360, all darkly shaded rectangles correspond to HVT device block areas. In order to avoid obstructing the drawing, not all of these HVT device block areas have been designated with the reference number 361. However, as used herein HVT device block areas 361 refers to all HVT device block areas in peripheral device area 360. Similarly, it is to be noted that in peripheral device area 360, all unshaded rectangles correspond to SVT device block areas. In order to avoid obstructing the drawing, not all of these SVT device block areas have been designated with the reference number 362. However, as used herein SVT device block areas 362 refers to all SVT device block areas in peripheral device area 360.

Core device area 370 includes HVT device block areas 371 and SVT device block areas 372. It is to be noted that in core device area 370, all darkly shaded rectangles correspond to HVT device block areas. In order to avoid obstructing the drawing, not all of these HVT device block areas have been designated with the reference number 371. However, as used herein HVT device block areas 371 refers to all HVT device block areas in core device area 370. Similarly, it is to be noted that in core device area 370, all unshaded rectangles correspond to SVT device block areas. In order to avoid obstructing the drawing, not all of these SVT device block areas have been designated with the reference number 372. However, as used herein SVT device block areas 372 refers to all SVT device block areas in core device area 370. In one embodiment, HVT device block areas 371 represent H-cell blocks, whereas SVT devices 372 represent memory blocks. In another embodiment, the memory blocks may also be blocks whose devices are HVT devices.

It is to be noted that in FIG. 3, SVT device block areas 312, 322, 362, and 372 do not represent real patterns on the mask layers. Instead, they represent the location of blocks on the structured ASIC whose devices are SVT devices. As noted above, in one embodiment, unless otherwise selected, devices in the structured ASIC would be SVT devices. In other words, in one embodiment, the default state for devices in the structured ASIC is SVT. As such, no pattern exists on VTHN mask layer 300 and VTHP mask layer 350 for blocks with SVT devices. By contrast, in FIG. 3, HVT device block areas 311, 321, 361, and 371 represent real patterns on VTHN and VTHP mask layers 300 and 350.

In one embodiment, HVT device block areas 311 and 361 represent blocks whose devices are thin oxide devices in the periphery of the IC. Also, in one embodiment, SVT device block areas 312 and 362 represent blocks whose devices are thick oxide devices in the periphery of the IC.

In one embodiment, to ensure that the incremental engineering effort to support HVT mask layers option 130-2 is worth the DC power savings, blocks in HVT mask layers option 130-2 are designed as HVT blocks if the DC power savings of those blocks as HVT blocks versus SVT blocks outweighs the incremental engineering effort to design those blocks as HVT blocks on HVT mask layers option 130-2. In one embodiment, the blocks in the structured ASIC that provide greater DC power savings as HVT devices rather than SVT devices and require less layout effort for preparation of the HVT mask layers are included as HVT blocks in HVT mask layers option 130-2. In one embodiment, the HVT mask layers option 130-2 would be designed such that blocks that are less susceptible to process, voltage and temperature (PVT) variation and need not run at a high frequency would be HVT blocks, whereas blocks that are more susceptible to PVT variation and need to run at a high frequency would be SVT blocks. Thus, in one embodiment, low-risk digital circuitry blocks would be HVT blocks, whereas high-risk analog circuitry blocks and static random access memory (SRAM) memory blocks would be SVT blocks. In one embodiment, the layout of block designed as HVT blocks in HVT mask layers option 130-2 but not SVT mask layers option 130-1 complies with the superset design rules for both SVT mask layers option 130-1 and HVT mask layers option 130-2. More specifically, they must comply with the superset design rules for both the VTHP and VTHN layers design rules for SVT mask layers option 130-1 and HVT mask layers option 130-2.

As noted above, in one embodiment, H-cell blocks in HVT mask layers option 130-2 are HVT blocks. In one embodiment, making H-cell blocks HVT blocks in HVT mask layers option 130-2 does not involve footprint area penalty, i.e., the die size for the H-cell blocks does need change, as design of H-cell blocks follows worst case rules.

In yet another embodiment, all blocks in the HVT mask layers option 130-2 would be HVT blocks. This would make all devices in the structured ASIC HVT devices when fabricated using such an HVT mask layers option. In other words, it would apply the HVT design globally to all devices in the structured ASIC using a base layer option, i.e., the HVT mask layers option.

In one embodiment, a structured ASIC fabricated using SVT mask layers option 130-1 provides better performance, whereas one fabricated using HVT mask layers option 130-2 provides greater power savings. More specifically, in one embodiment, a structured ASIC fabricated using SVT mask layers option 130-1 is better able to operate at a higher Fmax, whereas one fabricated using HVT mask layers option 130-2 provides greater DC power savings.

Table 1 below provides a comparison of an example of the power savings and performance improvement of structured ASICs fabricated using SVT mask layers option 130-1 or HVT mask layers option 130-2 relative to a comparable field programmable gate array (FPGA) device:

TABLE I

|  | SVT Mask Option | HVT Mask Option |
| --- | --- | --- |
| Need High Performance | Yes | No |
| Total DC Power Saving | 0-40% | 30-80% |
| Total AC Power Saving | Equivalent savings for both options | |

As can be seen from Table 1, both the SVT mask layers option structured ASIC and the HVT mask layers option structured ASIC can provide DC power savings over a comparable FPGA. As can also be seen from Table 1, the HVT mask layers option provides significant DC power savings (30-80%) over the SVT mask layers option (0-40%). If a user does not need to target high performance, then the user can benefit from the additional DC power savings of the HVT mask layers option. In other words, even though a structured ASIC device would already provide DC power savings relative to a comparable FPGA, if a customer's design does not need to run at a high Fmax, the customer can benefit from additional DC power savings by using the HVT mask layers option. As noted above, this can be achieved without additional NRE cost. As also noted above, the relative benefits of the SVT mask layers option and the HVT mask layers option will be modeled in the front-end design software for the customer's appreciation when making its performance versus power savings design tradeoff decision.

Although the above power savings are applicable generally, they are particularly useful in situations where it is desirable to reduce DC power consumption. As process technology migrates to finer technology nodes, the DC leakage power becomes more dominant compared to AC power due to the shorter gate length and thinner gate oxide of the devices. In other words, as process technology migrates to finer technology nodes, the contribution of DC leakage power to the total power becomes more significant. Also, in mobile applications, where prolonging battery life is important, DC leakage power can be more important than total DC and AC power as mobile devices are largely in standby/idle mode operation. Thus, use of the power savings techniques described above is particularly beneficial in the contexts of ICs fabricated using finer node process technologies and ICs used in mobile devices.

Although embodiments of the present invention have been described in the context of structured ASICs, such embodiments are not limited to being used in the context of structured ASICs. Instead, embodiments of the present invention may be used in the context of any ICs, particularly where benefits of using such embodiments outweigh the disadvantages, if any.

While the present invention has been particularly described with respect to the illustrated embodiments, it will be appreciated that various alterations, modifications and adaptations may be made based on the present disclosure, and are intended to be within the scope of the present invention. While the invention has been described in connection with what are presently considered to be the most practical and preferred embodiments, it is to be understood that the present invention is not limited to the disclosed embodiments but, on the contrary, is intended to cover various modifications and equivalent arrangements included within the scope of the appended claims.

What is claimed is:

1. A method of making an integrated circuit (IC), the method comprising:
   providing an option to select a mask layer set from a plurality of mask layer sets, the plurality of mask layer sets including a first mask layer set and a second mask layer set;
   wherein the second mask layer set is an alternative mask layer option to the first mask layer set,
   wherein the first mask layer set is a standard threshold voltage (SVT) mask layer set and the second mask layer set is a high threshold voltage (HVT) mask layer set, and
   wherein core devices of the SVT mask layer set are SVT devices and some periphery devices of the SVT mask layer set are HVT devices.

2. The method of claim 1 further comprising:
   receiving a selection from a user choosing a mask layer set from the plurality of mask layer sets.

3. The method of claim 1, wherein the plurality of mask layer sets are predetermined mask layer sets.

4. The method of claim 1 further comprising:
   preparing instructions for making the plurality of mask layer sets.

5. The method of claim 1, wherein the SVT mask layer set includes an SVT voltage threshold n-channel (VTHN) mask layer and an SVT voltage threshold p-channel (VTHP) mask layer and wherein the HVT mask layer set includes an HVT VTHN mask layer and an HVT VTHP mask layer.

6. The method of claim 1, wherein hybrid cell (H-cell) devices of the HVT mask layer set are HVT devices and some periphery devices of the HVT mask layer set are HVT devices.

7. The method of claim 1, wherein the plurality of mask layer sets includes a third mask layer set and a fourth mask layer set, wherein the third mask layer set is a low threshold voltage (LVT) mask layer set and the fourth mask layer set is an ultra low leakage (ULL) mask layer set.

8. The method of claim 1, wherein a mask layer of the first mask layer set and a corresponding mask layer of the second mask layer sets map to a physical layer in the IC.

9. A method of making an integrated circuit (IC), the method comprising:
   providing a standard voltage threshold (SVT) mask layers option, the SVT mask layers option including an SVT voltage threshold n-channel (VTHN) mask layer and an SVT voltage threshold p-channel (VTHP) mask layer; and
   providing a high voltage threshold (HVT) mask layers option, the HVT mask layers option including an HVT VTHN mask layer and an HVT VTHP mask layer;
   wherein the HVT mask layers option is an alternative to the SVT mask layers option, and
   wherein core devices of the SVT VTHN and VTHP mask layers are SVT devices and some periphery devices of the SVT VTHN and VTHP mask layers are HVT devices.

10. The method of claim 9 further comprising:
    receiving a selection from a user choosing the SVT mask layers option or the HVT mask layers option.

11. The method of claim 9, wherein the SVT VTHN and VTHP mask layers and the HVT VTHN and VTHP mask layers are predetermined mask layers.

12. The method of claim 9 further comprising:
preparing instructions for making the SVT VTHN and VTHP mask layers; and
preparing instructions for making the HVT VTHN and VTHP mask layers.

13. The method of claim 9, wherein hybrid cell (H-cell) devices of the HVT VTHN and VTHP mask layers are HVT devices and some periphery devices of the HVT VTHN and VTHP mask layers are HVT devices.

14. A method of making a structured application specific integrated circuit (ASIC), the method comprising:
providing an option to select between (a) a standard voltage threshold (SVT) mask set including an SVT voltage threshold n-channel (VTHN) mask layer and an SVT voltage threshold p-channel (VTHP) mask layer and (b) a high voltage threshold (HVT) mask set including an HVT VTHN mask layer and an HVT VTHP mask layer; and
receiving a selection from a user choosing either the SVT set or the HVT mask set;
wherein the HVT mask set is an alternative to the SVT mask set and the SVT mask set; the SVT and HVT mask sets map to two physical layers in the structured ASIC; core devices of the SVT mask set are SVT devices and some periphery devices of the SVT mask set are HVT devices; and hybrid cell (H-cell) devices of the HVT mask set are HVT devices and some periphery devices of the HVT mask set are HVT devices.

15. The method of claim 14, wherein the SVT VTHN and VTHP mask layers and the HVT VTHN and VTHP mask layers are predetermined mask layers.

16. The method of claim 14 further comprising:
preparing instructions for making the SVT VTHN and VTHP mask layers; and
preparing instructions for making the HVT VTHN and VTHP mask layers.

\* \* \* \* \*